(12) United States Patent
Quijano (10) Patent No.: US 7,377,603 B2
(45) Date of Patent: May 27, 2008

(54) COMPUTING DEVICE MOUNTING SYSTEMS

(75) Inventor: David Quijano, Magnolia, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 394 days.

(21) Appl. No.: 10/965,401

(22) Filed: Oct. 14, 2004

(65) Prior Publication Data

US 2006/0082265 A1 Apr. 20, 2006

(51) Int. Cl.
*A47B 81/00* (2006.01)

(52) U.S. Cl. .................... 312/245; 312/223.1

(58) Field of Classification Search ........... 312/245, 312/111, 265.5, 265.6, 223.2, 223.1; 248/121, 248/126; 361/679–686, 724–727; 403/351, 403/352, 348, 349; 52/28, 38, 39
See application file for complete search history.

(56) References Cited

U.S. PATENT DOCUMENTS

| | | | | |
|---|---|---|---|---|
| RE23,750 E | * | 12/1953 | Arsiman et al. ............ 338/131 |
| 3,633,151 A | * | 1/1972 | Sensabaugh ................ 439/333 |
| 4,632,594 A | * | 12/1986 | Del Tufo et al. ........ 403/322.4 |
| 5,213,233 A | * | 5/1993 | Schmitt ....................... 221/130 |
| 5,303,300 A | * | 4/1994 | Eckstein ................ 379/102.06 |
| 5,447,367 A | * | 9/1995 | Wei ........................... 312/223.2 |
| 5,747,734 A | * | 5/1998 | Kozlowski et al. ........... 174/50 |
| 5,796,585 A | * | 8/1998 | Sugiyama et al. .......... 361/735 |
| 5,868,813 A | * | 2/1999 | Mann et al. .................. 65/171 |
| 5,934,774 A | * | 8/1999 | Wu et al. ................. 312/223.2 |
| 5,941,493 A | * | 8/1999 | Cheng .......................... 248/371 |
| 6,108,195 A | * | 8/2000 | Behl et al. ................... 361/681 |
| 6,256,075 B1 | * | 7/2001 | Yang .......................... 348/843 |
| 6,295,036 B1 | * | 9/2001 | Mata et al. ................. 343/878 |
| 6,446,913 B1 | * | 9/2002 | Schroeder .................. 248/27.1 |
| 6,520,471 B2 | * | 2/2003 | Jones et al. ............. 248/346.5 |
| 6,520,605 B2 | * | 2/2003 | Nunokawa et al. ......... 312/111 |
| 6,570,756 B2 | * | 5/2003 | Alfonso et al. ............. 361/683 |
| 6,651,943 B2 | * | 11/2003 | Cho et al. ................. 248/122.1 |
| 6,700,080 B2 | * | 3/2004 | Stephens ..................... 177/126 |
| 6,791,827 B2 | * | 9/2004 | Kuo ........................... 361/683 |
| 6,909,598 B2 | * | 6/2005 | Cheng et al. ............... 361/683 |
| 6,938,966 B1 | * | 9/2005 | Rouwhorst .................. 312/111 |
| 6,962,272 B2 | * | 11/2005 | LeBlond ...................... 222/180 |
| 2002/0101710 A1 | * | 8/2002 | Diaz ........................... 361/685 |
| 2002/0105253 A1 | * | 8/2002 | Diaz et al. .............. 312/265.6 |
| 2002/0109509 A1 | * | 8/2002 | Ziegler et al. .............. 324/556 |
| 2003/0075603 A1 | * | 4/2003 | Rudduck ..................... 235/385 |
| 2004/0084578 A1 | * | 5/2004 | Cho et al. ................. 248/125.1 |
| 2004/0195842 A1 | * | 10/2004 | Lin ............................. 292/116 |
| 2005/0029414 A1 | * | 2/2005 | Jeong ...................... 248/122.1 |
| 2005/0180814 A1 | * | 8/2005 | Lehner et al. .............. 403/326 |
| 2005/0231901 A1 | * | 10/2005 | Xu .............................. 361/683 |
| 2006/0076463 A1 | * | 4/2006 | Drew ......................... 248/121 |

* cited by examiner

*Primary Examiner*—Janet M Wilkens

(57) ABSTRACT

In one embodiment, a computing device includes an outer housing having opposed sides, and a mounting feature provided on one of the opposed sides of the outer housing, the mounting feature being configured to secure the computing device to another object.

16 Claims, 9 Drawing Sheets

COMPUTING DEVICE MOUNTING SYSTEMS

BACKGROUND

In certain situations it may be desirable to place a computing device out of harm's way or at least out of the way of the user. Due to smaller and lighter weight computer devices becoming available, it is now possible to mount computing devices to other objects so as to not become damaged or interfere with the user. However, adequate mounting systems must be provided to facilitate such mounting.

SUMMARY

Disclosed are systems for mounting computing devices. In one embodiment, a computing device includes an outer housing having opposed sides, and a mounting feature provided on one of the opposed sides of the outer housing, the mounting feature being configured to secure the computing device to another object. In one embodiment, the mounting feature includes a base having a first side and a second side, and a raised portion that is provided on the first side of the base, the raised portion including a plurality of locking elements that are configured to engage mating locking elements of a computing device that is to be mounted.

BRIEF DESCRIPTION OF THE DRAWINGS

The disclosed systems and methods can be better understood with reference to the following drawings. The components in the drawings are not necessarily to scale.

DETAILED DESCRIPTION

Disclosed are systems and methods used to mount or attach a computing device to another object. In some embodiments, mounting features are provided on opposite sides of the computing device such that the computing device can mount or attach to a different object on each side of the device.

Figure 1:
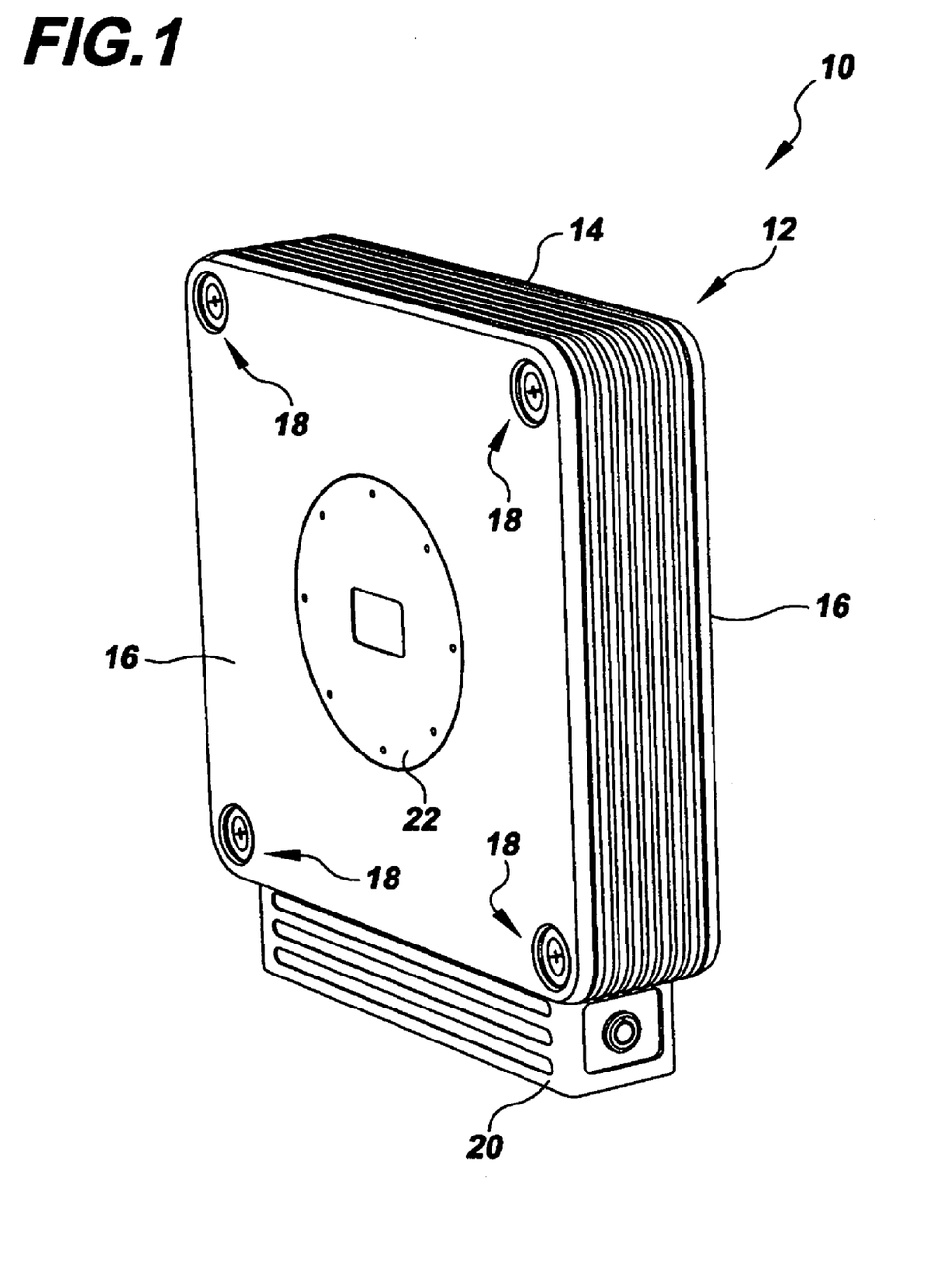
FIG. 1 is a perspective view of an embodiment of a computing device that is capable of being mounted or attached to other objects.
Figure 2:
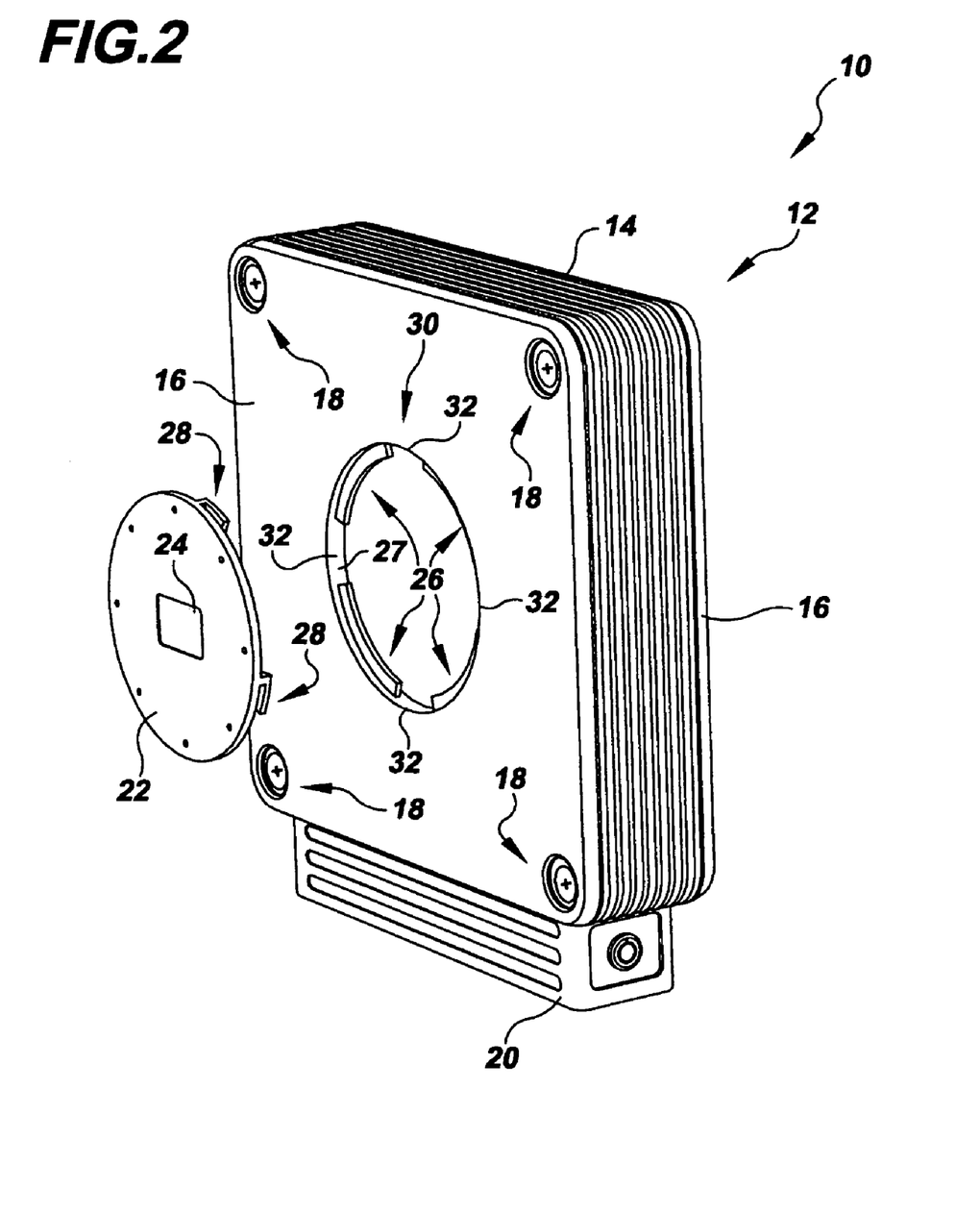
FIG. 2 is a partially-exploded perspective view of the computing device of FIG. 1, illustrating a cover plate removed from the computing device.
Figure 3:
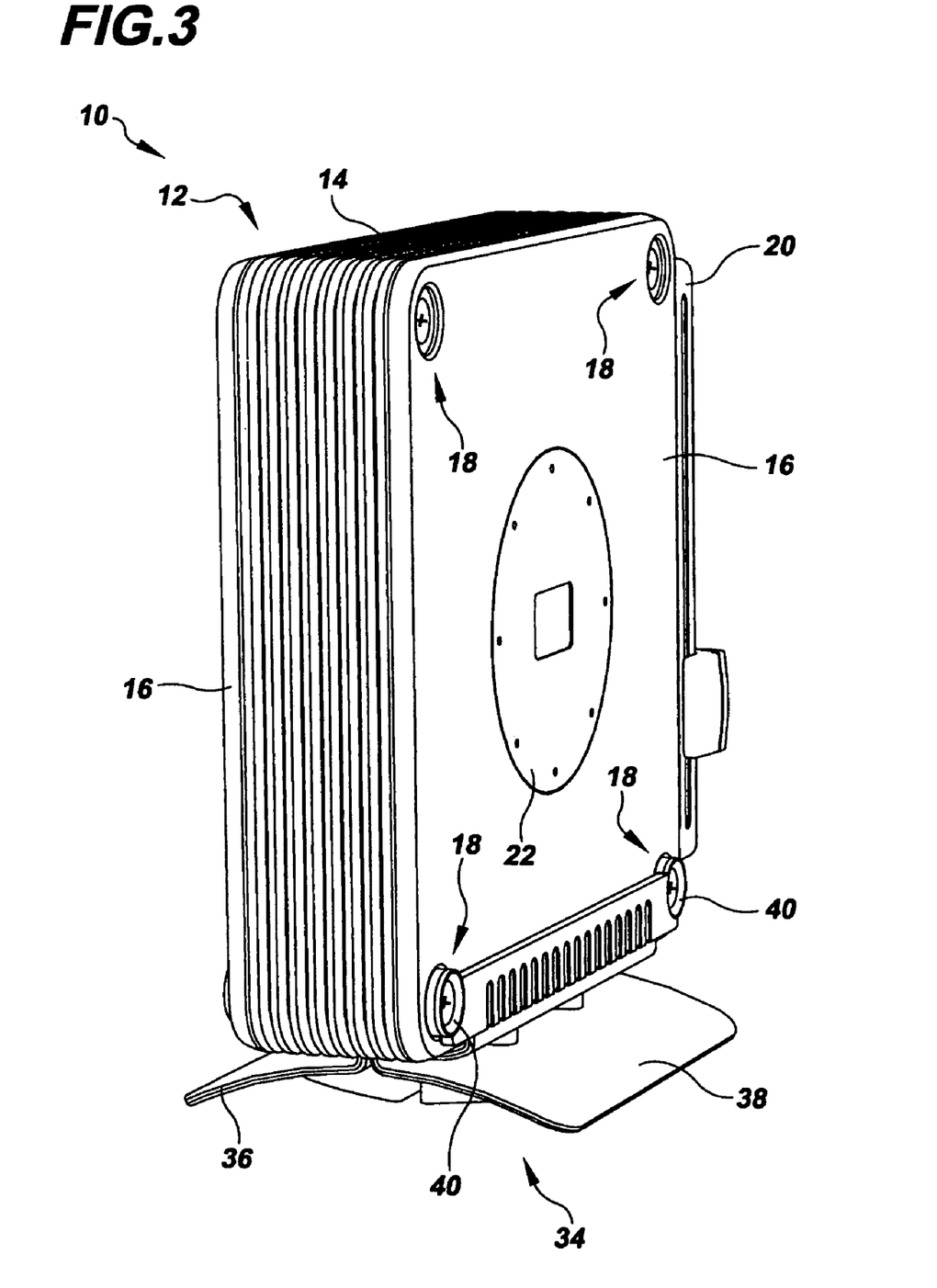
FIG. 3 is a perspective view of the computing device of FIGS. 1 and 2 shown supported by a removable stand.

Referring now in more detail to the drawings, in which like numerals indicate corresponding parts throughout the several views, FIGS. 1-3 illustrate an example computing device 10 that is configured for mounting or attachment to other objects. Objects to which the computing device can be mounted or attach include, for example, vertical surfaces (e.g., walls), flat panel displays, display stands, and other computing devices. Although such objects have been explicitly identified, the computing device 10 can mount or attach to other objects, for instance any object having a flat surface to which the computing device can be secured.

By way of example, the computing device 10 comprises a relatively compact and lightweight terminal computer of the type that includes no mass-storage drives such as a hard drive or a compact disc (CD) drive, but that may include other nonvolatile memory, such as one or more flash-based devices. In such a case, the computing device 10 may be used as a mechanism or means for accessing other computing devices, such as local or remote servers and therefore provide the same or similar functionality of the standard personal computer (PC). Although a terminal computer has been specifically identified as a possible embodiment, the computing device 10 can comprise another computing device that is of a size and weight that renders the device appropriate for mounting to other objects, such as those described in the following.

As is indicated in FIGS. 1-3, the computing device 10 is generally box-shaped and includes an outer housing 12, which protects the various hardware (e.g., circuit boards, processor, memory, etc.) that is contained within the computing device. The housing 12 includes a central frame 14 that includes multiple sides that define the edges of the computing device 10, and opposed side covers 16 that attach to the frame to enclose the internal hardware. In some embodiments, the housing 12 is formed so as to be particularly robust such that the computing device 10 can be used in relatively hostile environments in which vibration or jarring of the computing device is possible. In such cases, the frame 14 and the side covers 16 are made of a strong material, such as a metal material. By way of example, the frame 14 is a cast aluminum piece, and the covers 16 are stamped aluminum pieces. Regardless of their particular composition, the covers 16 can be attached to the frame 14 using threaded fasteners 18, such as screws.

As is most clearly shown in FIGS. 1 and 2, the computing device 10 further includes a cable cover 20 that is positioned on one of the sides of the central frame 14 (i.e., edges of the computing device). The cover 20 provides protection to the various connectors of the computing device (not shown) and to the various cables and connectors that connect to the device's connectors. In some embodiments, connector cables can be passed through protective conduits (not shown) that extend to the cable cover 20 so that the cables are not exposed and, therefore, are less susceptible to damage in a harsh environment.

With specific reference to FIGS. 1 and 3, provided on both side covers 16 are cover plates 22 that, as is described below, conceal mounting features provided on the covers. The cover plates 22 of the illustrated embodiment are round and each comprise a logo 24 in their center. As is illustrated with one cover plate 22 in FIG. 2, each cover plate 22 is removable from its side cover 16, and therefore the computing device 10. This removablility is enabled by a locking mechanism that is formed by the cover plate 22 and its associated side cover 16. The locking mechanism comprises locking elements 26 of the mounting feature provided on the side cover 16 that are configured to interface with mating locking elements 28 provided on one side of the cover plate 22.

By way of example, the device locking elements 26 comprise a set of locking ribs that are provided on a peripheral wall 27 of a circular recess 30 formed in the side cover 16, and the cover plate locking elements 28 comprise a set of locking tabs that are configured to engage and receive the locking ribs. In such a scenario, the cover plate 22 can be attached to the computing device 10 by positioning the cover plate's tabs 28 within gaps 32 provided between the ribs 26 of the side cover 16, and then rotating the cover plate in an appropriate direction (clockwise in the embodiment shown in FIG. 2) so that the plate tabs securely engage and receive the device ribs to hold the plate in place with a friction fit. Due to the manner in which the locking mechanism operates, the locking mechanism may be referred to as a twist-lock locking mechanism. In cases in which the cover plate 22 is to attach to the computing device 10 so as to be flush with the side cover 16 as shown in FIGS. 1 and 3, the recess 30 has an area that is slightly greater than that of the cover plate, and a depth that is slightly larger than the thickness of the cover plate.

In the example embodiment, four ribs 26 are provided on each of the side covers 16 to receive four tabs 28 provided on each cover plate 22. Greater or fewer ribs and tabs may be used, of course, to achieve similar attachment results. The number and position of the ribs and tabs are preferably chosen, however, such that the cover plates 22 can be attached to the computing device 10 in an orientation in which the logos 24 are right-side-up irrespective of the orientation of the computing device. Such functionality is illustrated in FIG. 3. As is indicated in that figure, the computing device 10 is rotated 90° relative to the orientation shown in FIGS. 1 and 2. This fact is evident from the relative position of the cable cover 20 in FIG. 3 as compared to FIGS. 1 and 2. Despite the different orientations of the computing device 10, however, the logo 24 appears right-side-up in each of FIGS. 1-3.

Although locking ribs and tabs are cited above as example type of locking elements, other locking elements can be used. For example, openings could be formed within the side covers 16 that are adapted to receive tabs or mounting studs of the cover plates 22. Moreover, detents can be used, if desired, to achieve snap fitting of the cover plates 22 to the computing device 10.

With further reference to FIG. 3, the computing device 10 is supported on a removable stand 34 that comprises two opposed halves 36 and 38. The opposed halves 36, 38 of the stand 34 attach to the computing device 10 using the threaded fasteners 18 that secure the side covers 16 to the frame 14. Specifically, two of those fasteners 18 are passed through openings 40 provided each of the stand halves, through the side cover 16, and are threaded into the frame 14. Although the stand 34 is typically not used when the computing device 10 is mounted to a mounting surface such as a wall or a mounting plate of a display stand, the stand may be employed in cases in which the computing device 10 is mounted to or coupled with another computing device (see discussion of FIG. 10).

Figure 4:
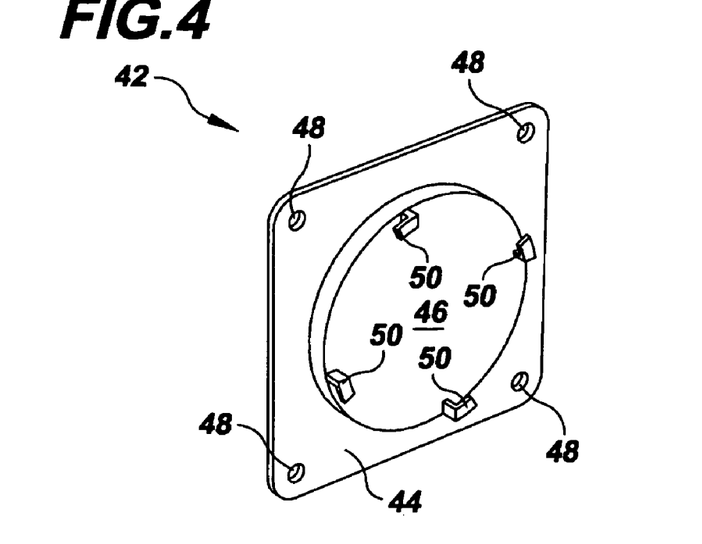
FIG. 4 is a perspective view of an embodiment of a mounting plate that can be used to mount the computing device of FIGS. 1-3 to other objects or vice versa.

When one or both of the cover plates 22 are removed, the computing device 10 can be mounted or attached to other objects. This mounting or attachment is achieved through use of a mounting plate, such as the mounting plate 42 shown in FIG. 4. As is indicated in FIG. 4, the example mounting plate 42 comprises a thin, planar, rectangular base 44 on which is provided a circular raised portion 46. For reasons described below, the base 44 is typically sized so that it can comprise a plurality of openings 48 that are spaced to comply with the Video Electronics Standards Association (VESA) standards for flat panel display mounting. In such a case, the openings 48 are spaced approximately 75 mm from each other or 100 mm from each other, depending upon the particular VESA standard at issue.

The raised portion 46 typically has the same size and configuration as the cover plates 22 such that the raised portion is configured for receipt within the recesses 30 formed in the side covers 16 when the cover plates have been removed. In addition, the raised portion 46 includes a plurality of locking elements 50 that are similar in size and configuration to those of the cover plates 22. Accordingly, in some embodiments, the locking elements 50 can comprise locking tabs, as is the case with the embodiment illustrated in FIG. 4. In the embodiment shown in FIG. 4, four such tabs 50 are provided that engage and receive four locking ribs 26 of the computing device 10 (see FIG. 2). Given that the mounting plate 42 may be used to support the computing device 10 and one or more other objects, the mounting plate is constructed of a strong material, such as a metal material or a high-strength polymer material.

Figure 5:
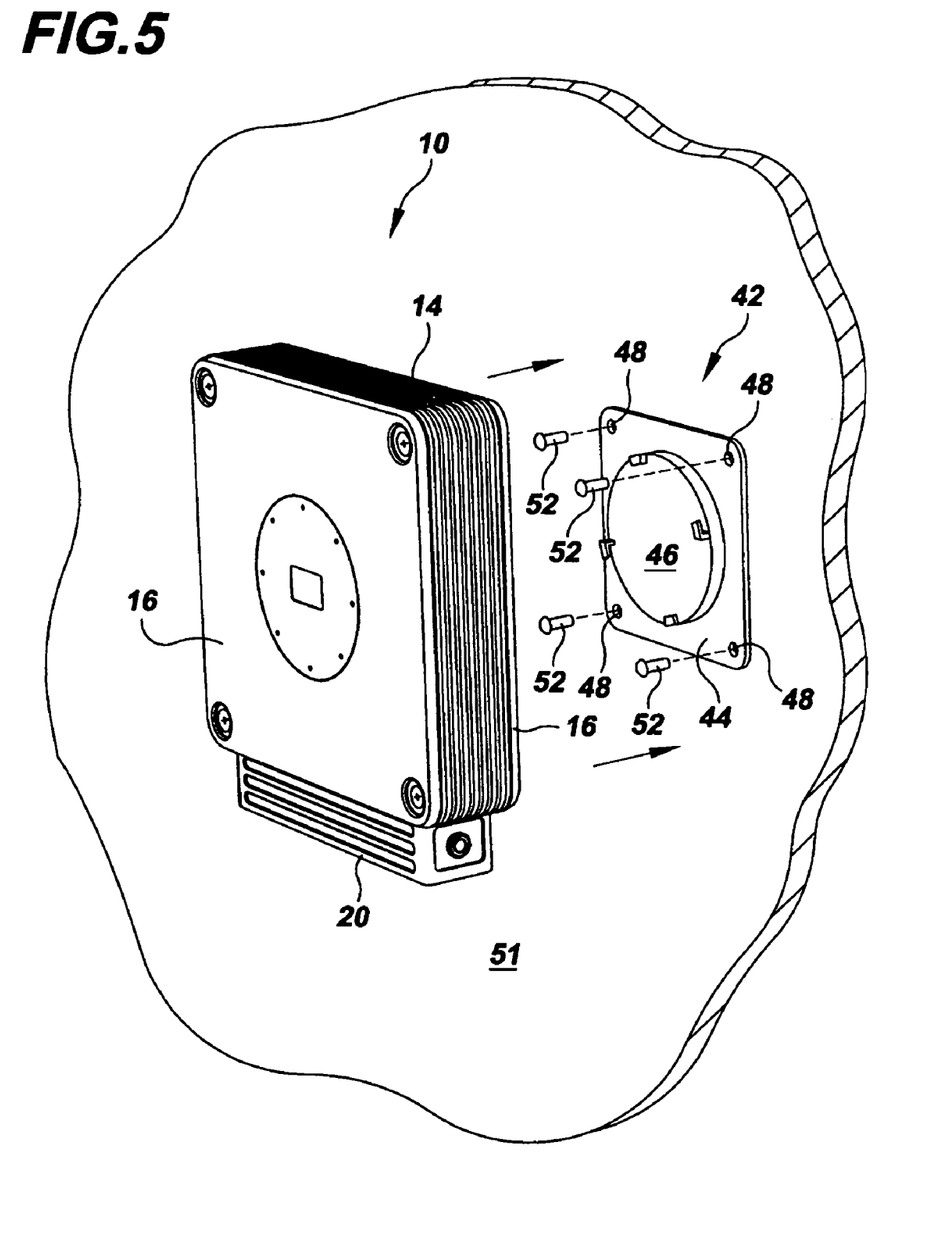
FIG. 5 is a perspective view of the computing device of FIGS. 1-3, illustrating mounting of the computing device to a wall using the mounting plate of FIG. 4.

FIG. 5 illustrates an example process for mounting the computing device 10 to an object, in this case a substantially vertical surface of a wall 51, using the mounting plate 42 of FIG. 4. As is indicated in FIG. 5, the mounting plate 42 is first secured to the wall 51 using a plurality of threaded fasteners 52 that are passed through the openings 48 in the plate and threaded into the wall (e.g., into a drywall mounting member or a wall stud). By way of example, the mounting plate 42 is secured to the wall at a position high above the ground so as to keep the computing device 10 out of harm's way. After the mounting plate 42 is secured to the wall 51, the computing device 10 can be attached to the mounting plate in similar manner to the way in which the cover plates 22 are attached to the computing device. Specifically, the locking elements 50 of the mounting plate 42 and the locking elements 26 of the computing device 10 cooperate to lock the mounting plate to the computing device and vice versa. Accordingly, the computing device 10 can be secured to the mounting plate 42, and therefore mounted to the wall 51, by positioning the computing device so that the locking elements 50 of the mounting plate 42 are positioned within the gaps 32 formed between the computing device locking elements 26 (see FIG. 2), and then rotating or twisting the computing device to engage the locking elements with each other until the computing device is securely held in place by the mounting plate (e.g., by friction fit). Once so secured, the computing device 10 is mounted to, and supported by, the wall 51.

Figure 6:
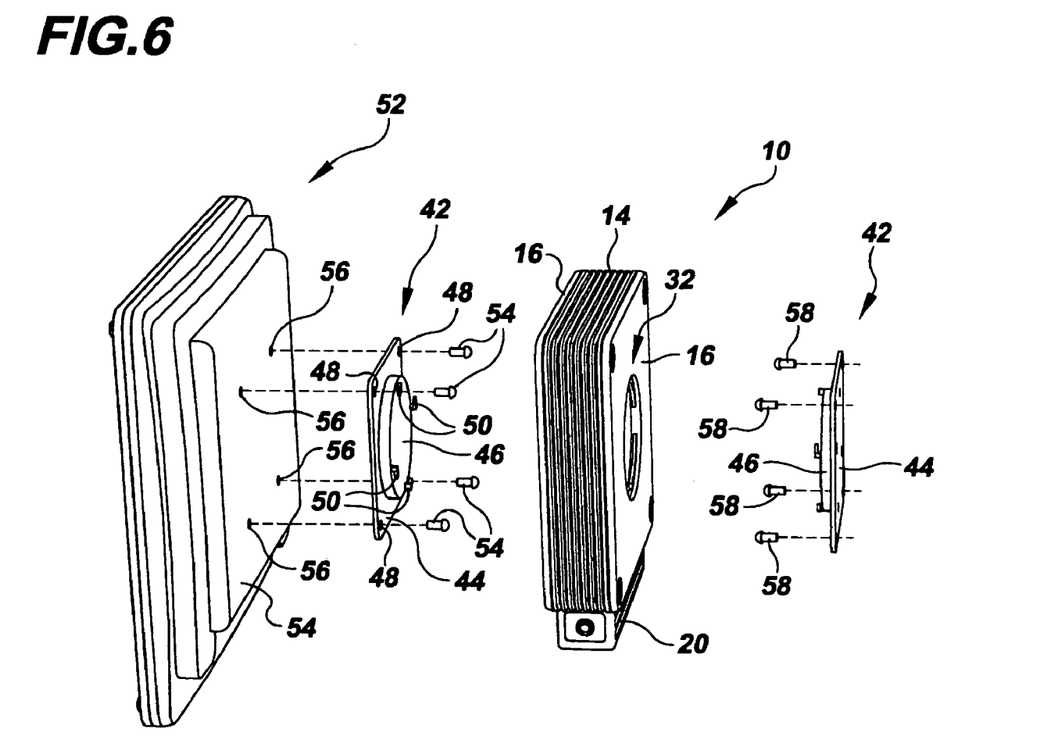
FIG. 6 is a perspective view illustrating an embodiment of a process of mounting a display to the computing device of FIGS. 1-3, and then mounting the display and the computing device to another object.

The mounting plate 42 can further be used to mount other objects to the computing device 10. Referring next to FIG. 6, illustrated an example process for mounting a flat panel display 52 to the computing device 10 using the mounting plate 42 shown in FIG. 4. As is indicated in FIG. 6, the mounting plate 42 can be secured to the display 52 using threaded fasteners 54. In particular, the threaded fasteners 54, such as screws, can be passed through the openings 48 of the mounting plate 42, and threaded into mounting holes 56 provided in the rear side 58 of the display 52.

After the mounting plate 42 is secured to the display 52, the display can be mounted to the computing device 10 (or vice versa) using the locking elements 50 of the mounting plate. Specifically, the locking elements 50 of the mounting plate 42 and the locking elements 26 of the computing device 10 (see FIG. 2) cooperate to lock the display and computing device together. Accordingly, mounting of the display 52 to the computing device 10 can be achieved by positioning the display and/or the computing device so that the locking elements 50 of the mounting plate 42 are positioned within the gaps 32 formed between the computing device locking elements 26 (see FIG. 2), and rotating or twisting the display and/or the computing device until the two components are secured together.

Either before or after securing the display 52 and the computing device 10 to each other, another mounting plate 42 (to the right of the computing device in FIG. 6) can be secured to a desired mounting surface, for example using further threaded fasteners 58, such as screws or bolts. For example, the mounting plate 42 can be secured to a wall or a display stand as is described below in relation to FIGS. 7A and 7B.

Figure 7A:
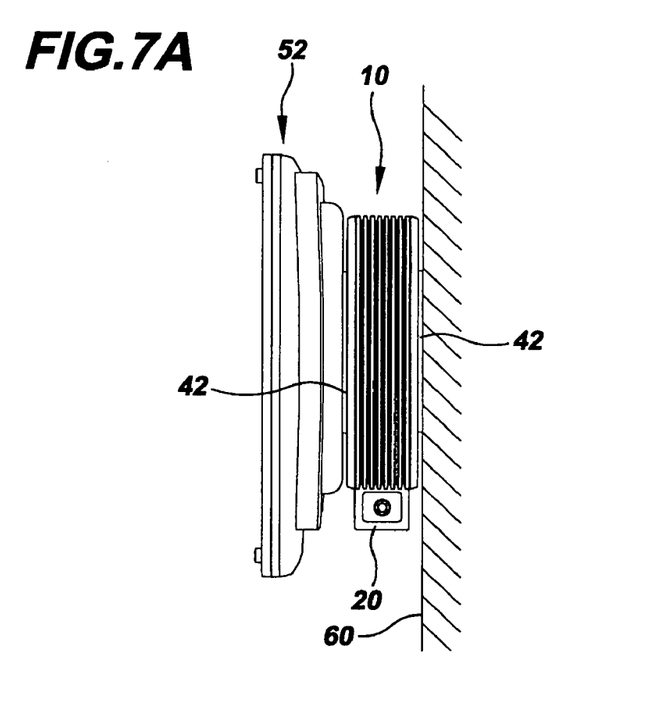
FIG. 7A is a side view illustrating the apparatus of FIG. 6 mounted to a wall.

FIGS. 7A and 7B illustrate two mounting arrangements that can be achieved using the apparatus of FIG. 6. With reference first to FIG. 7A, illustrated is a wall-mounting arrangement in which the display 52 and computing device 10, which are secured to each other with a first mounting plate 22, are secured to a wall 60 with a second mounting plate 22 in similar manner to that described above in relation to FIG. 5.

Figure 7B:
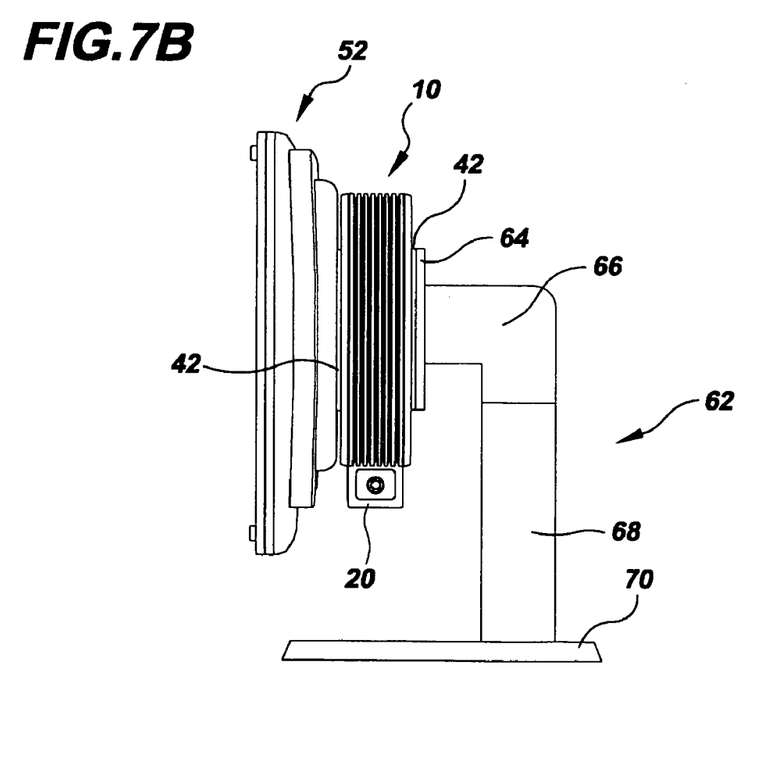
FIG. 7B is a side view illustrating the apparatus of FIG. 6 mounted to a flat panel display stand.

Next, with reference to FIG. 7B, illustrated is a display stand mounting arrangement in which the display 52 and the computing device 10 are mounted to a display stand 62 using a mounting plate 22. In particular, the mounting plate 22 that is not secured to the display 52 is secured to a mounting plate 64 of the display stand. That mounting plate 64 is positioned at the end of an arm 66 that extends from a column 68 of the stand 62, which extends from a base 70 of the stand. The computing device 10 (and the display 52) is then locked to the mounting plate 22 in similar manner to that described above.

Figure 8:
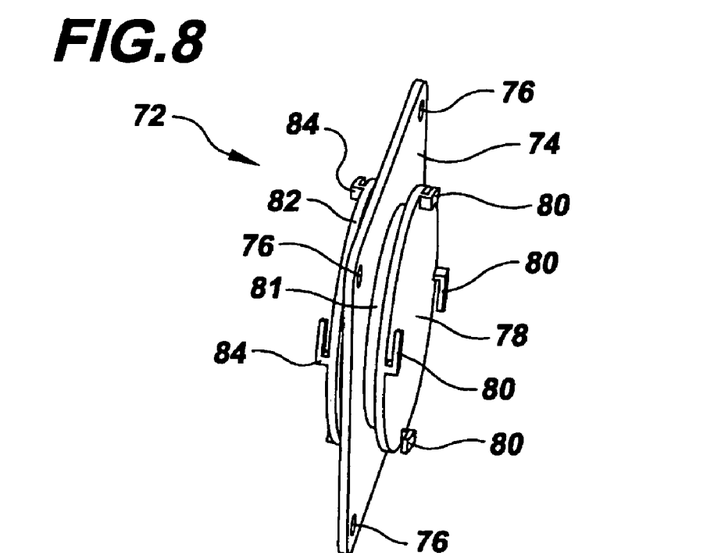
FIG. 8 is a perspective view of an embodiment of a double-sided mounting plate that can be used to mount the computing device of FIGS. 1-3 to other objects.

In addition to mounting the computing device 10 to the mounting arrangements described above, the computing device can further be attached to other computing devices having similar locking elements. Such attachment is possible through use of a double-sided mounting plate, such as mounting plate 72 shown in FIG. 8. As is indicated in FIG. 8, the double-sided mounting plate 72 is similar in several respects to the mounting plate 42 shown in FIG. 4. Accordingly, the mounting plate 72 includes a planar base 74 that comprises a plurality of openings 76 that, for example, comply with VESA display mounting standards, and a raised portion 78 provided on one side of the plate that includes a plurality of locking elements 80, such as locking tabs. Optionally, the raised portion 78 can be raised up beyond the surface of the base 74 with a neck portion 81. In addition, however, the double-sided mounting plate 72 includes a second raised portion 82 that is provided on the opposite side of the plate, which also includes a plurality of locking elements 84. Preferably, the raised portion 82 and locking elements 84 are substantially identical in size and configuration to the raised portion 78 and locking elements 80, respectively, such that the mounting plate 72 can attach to identical computing devices 10 on both sides. Optionally, the raised portion 82 may also be raised above the surface of the base 74 with a next portion (not visible in FIG. 8) that is substantially identical to the neck portion 81.

Figure 9:
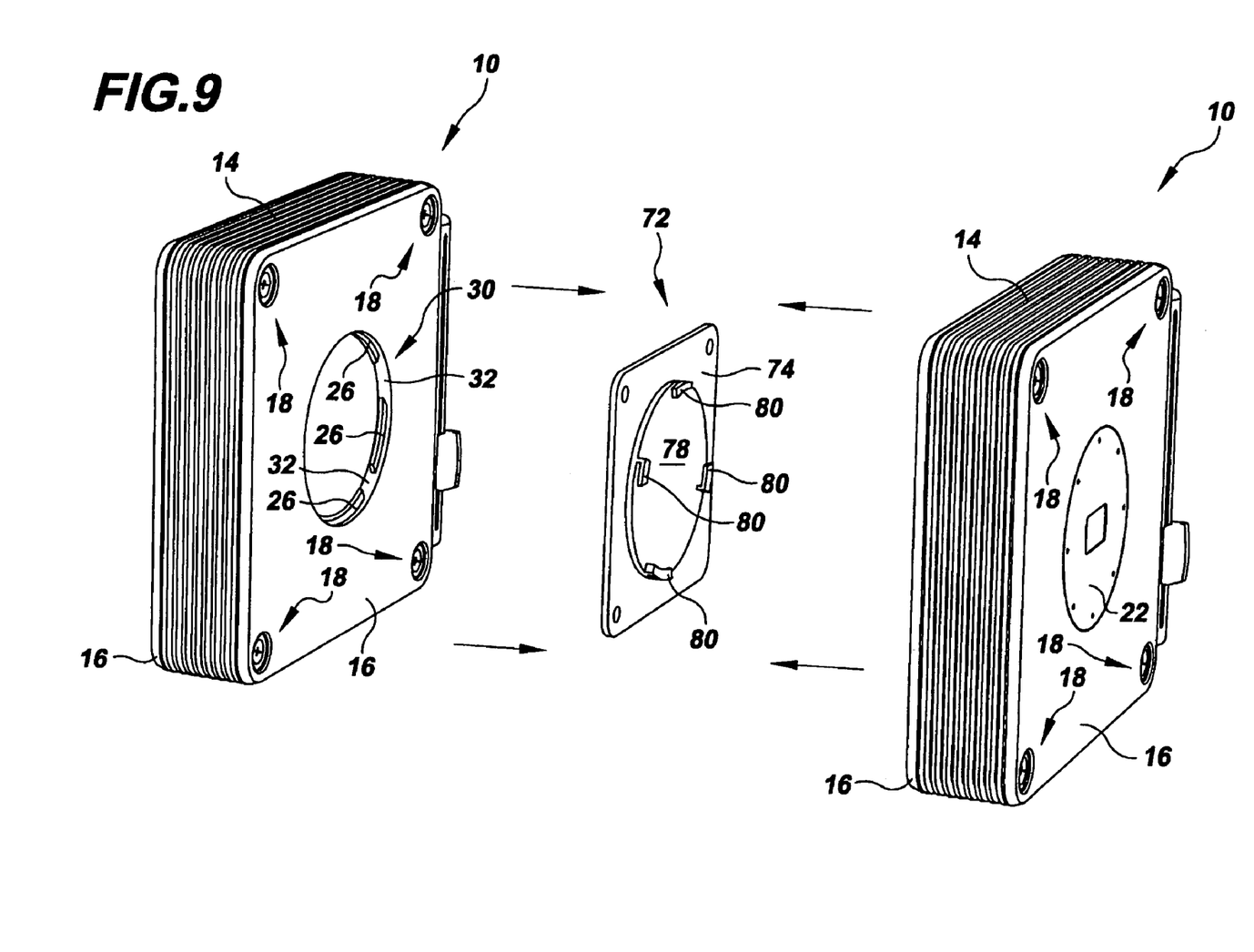
FIG. 9 is a perspective view illustrating an embodiment of a process of attaching two computing devices to each other using the double-sided mounting plate of FIG. 8.

FIG. 9 illustrates the manner in which two substantially identical computing devices 10 can be attached to each other using the double-sided mounting plate 72. To accomplish such attachment, the inside cover plate 22 of each computing device 10 is removed (as is indicated in FIG. 9 by the absence of the cover plate from the computing device 10 shown on the left). Once the cover plates 22 are removed, the mounting plate 72 can be attached to one of the computing devices in the same manner in which the computing device 10 is mounted to the mounting plate 42 described above in relation to FIGS. 5 and 6. Next, the other computing device 10 is attached to the mounting plate 72 in the same manner again such that both computing devices are attached to the mounting plate and, therefore, the two computing devices are securely connected to each other.

Figure 10:
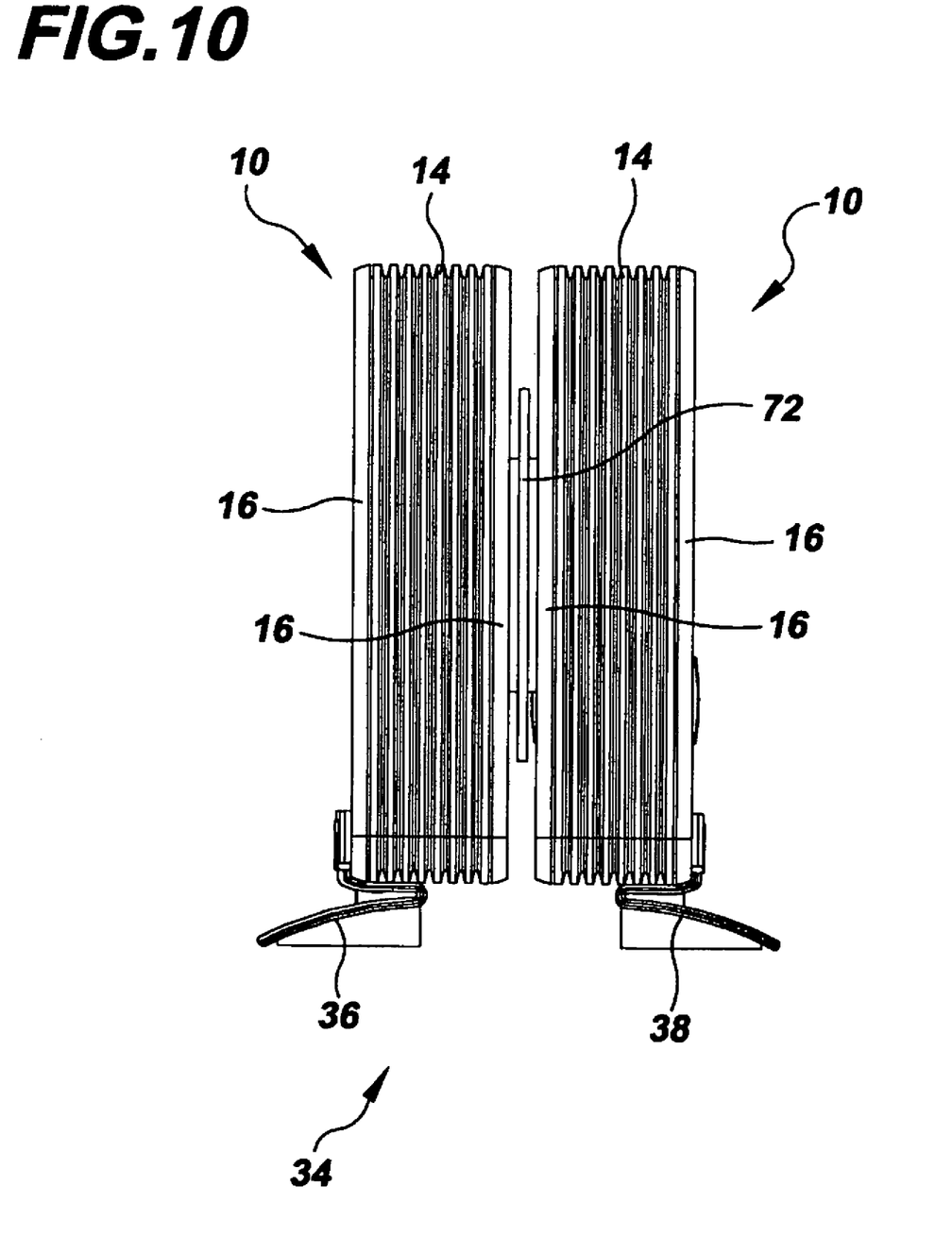
FIG. 10 is a side view illustrating the two computing devices attached to each other and supported by the stand shown in FIG. 3.

FIG. 10 illustrates two computing devices 10 connected together with a double-sided mounting plate 72 in accordance with the procedure described above in relation to FIG. 9. As is shown in FIG. 10, the two connected computing devices 10 can be supported by the stand 34 first identified in FIG. 3. Specifically, the two stand halves 36, 38 can be separated and separately attached to the two computing devices 10 so that the stand 34 supports both computing devices.

As will be appreciated by persons having ordinary skill in the art, many alternative mounting and/or attachment arrangements beyond those specifically described herein may be achieved using the systems and methods of this disclosure. For example, multiple computing devices 10 can be attached together and mounted to a mounting surface, such as a wall or a mounting plate of a display stand. In addition, three or more computing devices 10 can be attached together in a chain, in similar manner to that shown in FIG. 10, and be supported with the stand 34 or another appropriate mechanism. All such alternatives are intended to fall within the scope of the present disclosure.

What is claimed is:

1. A computer, comprising:
    an outer housing that houses internal components of the computer, the outer housing including a side cover having a planar outer surface;
    a processor and memory contained within the outer housing;
    locking elements that are integrally formed within the side cover of the outer housing, the locking elements enabling the computer to be mounted to and supported by a substantially vertical surface of a supporting object such that the weight of the computer is supported solely by the supporting object; and
    a removable cover plate including a planar outer surface and locking elements that engage the locking elements of the side cover such that the removable cover plate can be attached to the side cover so as to conceal the locking elements when the locking elements are not used to support the computer, wherein the outer surface of the cover plate is substantially flush with the planar outer surface of the side cover when attached to the side cover such that the removable cover plate does not extend outwardly from the side cover when attached to the side cover.

2. The computer of claim 1, wherein the outer housing comprises a central frame to which the side cover attaches.

3. The computer of claim 1, wherein the computer comprises two opposed side covers, each side cover including integrally formed locking elements.

4. The computer of claim 1, wherein the locking elements are provided within a recess formed in the side cover.

5. The computer of claim 4, wherein the entirety of the cover plate is received by the recess.

6. The computer of claim 5, wherein the recess and cover plate are circular.

7. The computer of claim 4, wherein the locking elements of the side cover comprise ribs provided on a peripheral wall of the recess.

8. The computer of claim 7, wherein the locking elements of the cover plate comprise locking tabs that engage and receive the ribs.

9. A mounting plate for mounting a computing device, the mounting plate comprising:
- a planar base having a first side, a second side, and openings specifically configured for receipt and passage of mounting fasteners;
- a first raised platform that extends outwardly from the first side of the base, the raised platform including a plurality of locking elements that extend outwardly from the raised platform, the locking elements being configured to engage mating locking elements of a first computer that is to be mounted; and
- a second raised platform that is provided on the second side of the base, the second raised platform including a plurality of locking elements that are configured to engage mating locking elements of a second computer that is to be mounted.

10. The mounting plate of claim 9, wherein the raised platforms are thin and circular.

11. The mounting plate of claim 9, wherein the locking elements comprise locking tabs that are configured to receive locking ribs provided on the computers.

12. A mounting system for a computing device, the system comprising:
- a side cover configured to be used as part of an outer housing of the computing device;
- a mounting feature integrally formed within the side cover, the mounting feature including a plurality of locking elements;
- a removable cover plate including locking elements that are configured to engage the locking elements of the mounting feature such that the cover plate can be attached to the side cover so as to conceal the mounting feature; and
- a mounting plate including locking elements that are configured to engage the locking elements of the mounting feature such that the side cover can be secured to the mounting plate when the mounting plate has been mounted to another object so as to mount the side cover to the other object.

13. The mounting system of claim 12, wherein the mounting feature is provided within a recess formed in the side cover.

14. The mounting system of claim 13, wherein the cover plate is configured for receipt by the recess.

15. The mounting system of claim 14, wherein the locking elements of the side cover comprise ribs provided on a peripheral wall of the recess.

16. The mounting system of claim 15, wherein the locking elements of the cover plate and the mounting plate comprise locking tabs that engage and receive the ribs.

* * * * *